United States Patent
Shankaran et al.

(10) Patent No.: US 9,847,907 B2
(45) Date of Patent: Dec. 19, 2017

(54) DISTRIBUTED CACHING CLUSTER MANAGEMENT

(71) Applicant: Amazon Technologies, Inc., Reno, NV (US)

(72) Inventors: Nishanth Shankaran, Kirkland, WA (US); Dong Shou, Seattle, WA (US); Rajat Arya, Seattle, WA (US); Clint Joseph Sbisa, Seattle, WA (US); Shyam Krishnamoorthy, Kirkland, WA (US); Rajaprabhu Thiruchi Loganathan, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 436 days.

(21) Appl. No.: 13/685,615

(22) Filed: Nov. 26, 2012

(65) Prior Publication Data

US 2014/0149537 A1     May 29, 2014

(51) Int. Cl.
*G06F 15/167* (2006.01)
*H04L 12/24* (2006.01)
*H04L 29/08* (2006.01)

(52) U.S. Cl.
CPC ...... *H04L 41/0816* (2013.01); *H04L 41/0668* (2013.01); *H04L 67/2842* (2013.01)

(58) Field of Classification Search
None
See application file for complete search history.

(56) References Cited

U.S. PATENT DOCUMENTS

| 6,243,814 B1* | 6/2001 | Matena ........... G06F 11/142 714/5.11 |
| 6,606,643 B1* | 8/2003 | Emens ........... H04L 29/06 709/200 |

(Continued)

FOREIGN PATENT DOCUMENTS

| JP | 2002-132568 A | 5/2002 |
| JP | 2010-009448 A | 1/2010 |

(Continued)

OTHER PUBLICATIONS

Memcached. Datasheet [online]. Wikipedia, 2012 [retrieved on Nov. 29, 2012]. Retrieved from the Internet: <URL: http://en.wikipedia.org/wiki/Memcached>.

(Continued)

*Primary Examiner* — Joshua Joo
(74) *Attorney, Agent, or Firm* — Kilpatrick Townsend & Stockton LLP

(57) ABSTRACT

A management system may enable and monitor a cache or other cluster to make the cluster configuration-aware such that initialization and changes to the underlying structure of the cluster can be dynamically updated. For example, a distributed memory caching system may provide initial configuration to a client from a memory caching node referenced by an alias provided by a configuration endpoint. Updates of configuration may be retrieved from memory caching nodes, each storing current configuration of the cache cluster. A management system monitors changes to the cache cluster, such as provisioning of new caching nodes, and updates the configuration stored in the caching nodes for retrieval by a client.

25 Claims, 13 Drawing Sheets

(56) References Cited

U.S. PATENT DOCUMENTS

| | | | |
|---|---|---|---|
| 7,197,632 B2* | 3/2007 | Rao et al. ............... | 713/1 |
| 7,406,473 B1 | 7/2008 | Brassow et al. | |
| 8,271,652 B2 | 9/2012 | Ezolt et al. | |
| 8,601,101 B1* | 12/2013 | Singh ............. | H04L 69/40 |
| | | | 370/254 |
| 8,805,949 B2* | 8/2014 | Aviles ............. | H04L 41/0893 |
| | | | 709/203 |
| 8,856,335 B1* | 10/2014 | Yadwadkar et al. ........ | 709/226 |
| 2002/0042693 A1* | 4/2002 | Kampe ............. | H04L 12/2602 |
| | | | 702/186 |
| 2003/0191927 A1 | 10/2003 | Joy et al. | |
| 2003/0236800 A1* | 12/2003 | Goeltzenleuchter et al. | 707/204 |
| 2004/0197079 A1* | 10/2004 | Latvala ............. | H04L 29/06 |
| | | | 386/200 |
| 2004/0243673 A1* | 12/2004 | Goyal ............. | G06F 17/30067 |
| | | | 709/204 |
| 2004/0249904 A1* | 12/2004 | Moore ............. | H04L 29/06 |
| | | | 709/216 |
| 2005/0015471 A1 | 1/2005 | Zhang et al. | |
| 2006/0037016 A1 | 2/2006 | Saha et al. | |
| 2006/0053337 A1 | 3/2006 | Pomaranski et al. | |
| 2007/0204061 A1 | 8/2007 | Chen et al. | |
| 2008/0031238 A1* | 2/2008 | Harmelin ............. | H04L 41/0843 |
| | | | 370/389 |
| 2008/0059721 A1 | 3/2008 | Turner et al. | |
| 2009/0006531 A1 | 1/2009 | Gillum et al. | |
| 2009/0144388 A1* | 6/2009 | Gross ............. | G06F 12/0813 |
| | | | 709/213 |
| 2009/0144800 A1* | 6/2009 | Black-Ziegelbein et al. | 726/1 |
| 2009/0182836 A1 | 7/2009 | Aviles et al. | |
| 2009/0276540 A1* | 11/2009 | Ahn et al. ............... | 709/243 |
| 2009/0313436 A1 | 12/2009 | Krishnaprasad et al. | |
| 2010/0030914 A1 | 2/2010 | Sparks et al. | |
| 2010/0030964 A1* | 2/2010 | Aciicmez ............. | G06F 12/1425 |
| | | | 711/119 |
| 2010/0281216 A1 | 11/2010 | Patel et al. | |
| 2010/0299553 A1 | 11/2010 | Cen | |
| 2011/0082908 A1 | 4/2011 | Ban et al. | |
| 2012/0059832 A1 | 3/2012 | Zamarreno et al. | |
| 2012/0144232 A1* | 6/2012 | Griffith et al. ............. | 714/4.12 |
| 2012/0151245 A1 | 6/2012 | Chang et al. | |
| 2012/0166394 A1 | 6/2012 | Kim et al. | |
| 2012/0191773 A1* | 7/2012 | Appleton ............. | 709/203 |
| 2012/0191912 A1 | 7/2012 | Kadatch et al. | |
| 2012/0254669 A1* | 10/2012 | Xia et al. ............. | 714/47.2 |
| 2012/0331016 A1* | 12/2012 | Janson ............. | G06F 17/30557 |
| | | | 707/809 |
| 2013/0103787 A1* | 4/2013 | Glover ............. | H04L 67/1002 |
| | | | 709/217 |
| 2013/0198350 A1 | 8/2013 | Moore et al. | |
| 2013/0262613 A1 | 10/2013 | Hayashi et al. | |
| 2013/0262683 A1 | 10/2013 | Hayashi et al. | |
| 2013/0332484 A1 | 12/2013 | Gajic et al. | |
| 2013/0339385 A1* | 12/2013 | Abrams et al. ............. | 707/770 |
| 2013/0339494 A1 | 12/2013 | Mithyantha | |
| 2014/0019798 A1 | 1/2014 | Allison et al. | |
| 2014/0317159 A1* | 10/2014 | Dhavale ............. | G06F 3/0647 |
| | | | 707/823 |
| 2015/0378893 A1* | 12/2015 | Atkisson ............. | G06F 12/0802 |
| | | | 711/118 |

FOREIGN PATENT DOCUMENTS

| | | |
|---|---|---|
| JP | 2012-059257 | 3/2012 |
| JP | 2012-208781 A | 10/2012 |
| JP | 2013-205891 A | 10/2013 |

OTHER PUBLICATIONS

PCT Application No. PCT/US13/71073, International Search Report and Written Opinion, dated May 14, 2014.
U.S. Appl. No. 13/685,596, titled "Distributed Caching Cluster Configuration", filed Nov. 26, 2012.
U.S. Appl. No. 13/685,607, titled "Distributed Caching Cluster Client Configuration", filed Nov. 26, 2012.
U.S. Appl. No. 13/685,620, titled "Replication in Distributed Caching Cluster", filed Nov. 26, 2012.
"Hashing", Presentation. (Fall 2007), 50 pages.
Fitzpatrick Brad, "Distributed Caching with Memcached", *Linux Journal*, vol. 2004 Issue 124, Aug. 1, 2004 [retrieved on Sep. 2, 2015] Retrieved from the Internet: <URL: http://www.linuxjournal.com/article/7451 ?page=O,1>, 8 pages.
Sedgewick et al., "Algorithms and Data Structures Fall 2007", (Fall 2007), 1 page.
SG11201503721V , "Written Opinion", dated Sep. 23, 2015, 5 pages.
CN201380061676.5 , "Office Action", dated Nov. 21, 2016, 18 pages.
Decandia et al., "Dynamo: Amazon's Highly Available Key-value Store", *Proceedings of Twenty-First ACM SIGOPS Symposium on Operating Systems Principles* (2007), pp. 205-220.
Mateescu et al., "Hybrid Computing—Where HPC meets grid and Cloud Computing", *Future Generation Computer Systems*, vol. 27, Issue 5 (Nov. 3, 2010), pp. 440-453.
Best Practices in Evaluating Elastic Load Balancing. [online] Amazon Web Services, Inc., Feb. 27, 2012 [retrieved on Sep. 17, 2016]. Retrieved from the Internet: <URL: http://aws.amazon.com/articles/1636185810492479>, 6 pages.
CA2,891,339 , "Office Action", dated Jul. 5, 2016, 3 pages.
EP13857139.3 , "Extended European Search Report", dated Jul. 7, 2016, 10 pages.
JP2015-544115, "Office Action", dated Aug. 9, 2016, 15 pages.
SG11201503721V , "Notice of Decision to Grant", dated Aug. 2, 2016, 4 pages.
CA2,891,339 , "Office Action", dated Feb. 27, 2017, 5 pages.
CN201380061676.5 "Office Action", dated Apr. 21, 2017, 8 pages.
JP2015-544115 , "Office Action", dated Apr. 3, 2017, 6 pages.

* cited by examiner

DISTRIBUTED CACHING CLUSTER MANAGEMENT

CROSS-REFERENCE TO RELATED APPLICATIONS

This application is related to and incorporates by reference for all purposes the full disclosure of co-pending U.S. patent application Ser. No. 13/685,596, filed Nov. 26, 2012, entitled "DISTRIBUTED CACHING CLUSTER CONFIGURATION", co-pending U.S. patent application Ser. No. 13/685,607, filed Nov. 26, 2012, entitled "DISTRIBUTED CACHING CLUSTER CLIENT CONFIGURATION" and co-pending U.S. patent application Ser. No. 13/685,620, filed Nov. 26, 2012, entitled "REPLICATION IN DISTRIBUTED CACHING CLUSTER".

BACKGROUND

Data centers provide computing resources for use by one or more clients. These services may include computing, storage and networking services. For example, a data center may provide a machine to host an application, storage to store application data, cache to quickly respond to repeated data requests and networking to enable communication between resources. By making use of the data center services, a customer may pay for computing and/or resource use rather than purchasing anticipated hardware needs. This enables a customer to expand and contract use of computing services according to demand. For example, an application may be configured to request more storage as needed rather than a developer or administrator monitoring and anticipating use.

On demand systems may be used to reduce the number of times a database must be read by caching data and objects from the database. For example, one implementation uses a client centered architecture where a client knows the servers, but the servers are not known to each other. To read or set a key, the client uses a hash to determine which server to contact and contacts that server. The server then calculates a second hash to determine where to store or read the corresponding value. Additions or subtractions to the group of servers are managed by the client.

BRIEF DESCRIPTION OF THE DRAWINGS

Various embodiments in accordance with the present disclosure will be described with reference to the drawings, in which.

DETAILED DESCRIPTION

Figure 1:
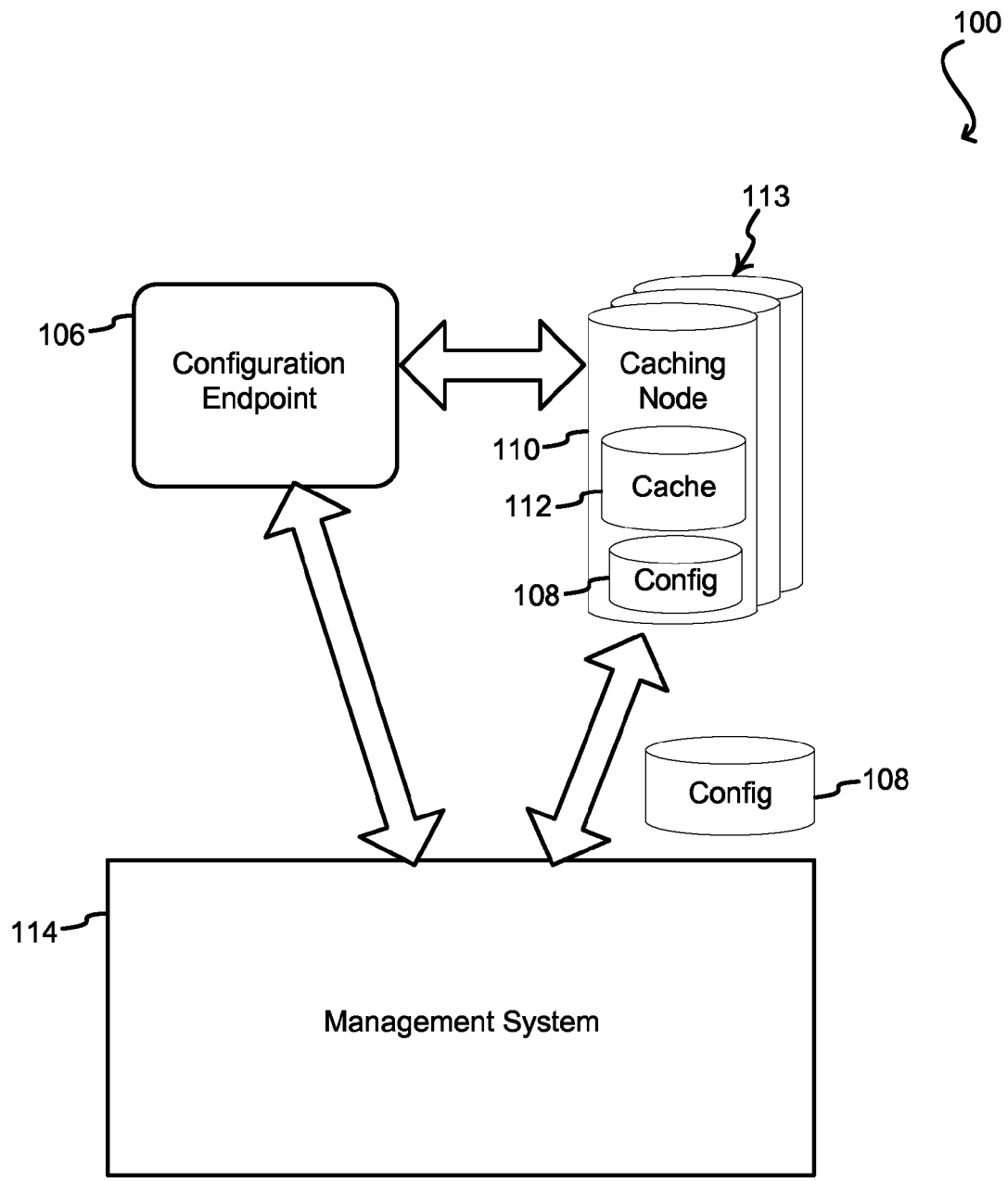
FIG. 1 shows an illustrative example of cluster caching management in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include enabling and monitoring of a cache cluster to make the cache cluster configuration-aware such that initialization and changes to the underlying structure of the cache cluster can be dynamically updated. For example, a cache cluster may comprise a set of one or more memory caching nodes. A configuration may be an indication of, among other things, the number of memory caching nodes in the cache cluster and the location of the memory caching nodes. The configuration may be maintained, in one embodiment, at each of the set of one or more memory caching nodes. As such, each memory caching node may be aware of the configuration of every memory caching node in the cache cluster. A memory caching node storing the configuration may be referenced by an alias in a configuration endpoint. When a client is first attempting to connect to the cache cluster, the client may resolve an alias from a static configuration endpoint to a memory caching node in a cache cluster. The client may request initial configuration from the memory caching node. As additional requests are made to the cache cluster, a first memory caching node may change in one or more ways (such as being added or removed from the cache cluster). As such, the configuration may be updated and sent to each of the set of one or more memory caching nodes in the cache cluster. A management system monitors these changes to the cache cluster, the changes including, for example, provisioning of new memory caching nodes or replacement of failing memory caching nodes. The management system may also update the configuration stored in memory caching nodes. The client may then obtain the updated configuration directly from a memory caching node that has the current configuration of the cache cluster. As such, updated configurations are easily obtained by a client without having to resolve a memory caching node via the configuration endpoint after a node has been resolved. The management system may include one or more computing resources that manage the cache cluster. It should be noted that a plurality of memory caching nodes may grouped together in one or more ways to create a cache cluster.

A cache cluster may cache data and object to reduce accesses to a data source. The cache cluster may include one or more memory caching nodes. Each node may store a portion of a set of cached data. The cached data may be split between memory caching nodes based on keys that are used to retrieve an element of data from the cache cluster. Data sources may include a database, application programming interface (API) or other data store or data source. The memory caching nodes may use computer memory as storage for cache, such as RAM, to speed up responses to requests.

In one illustrative example, a cache cluster is managed by a management system. The management system may determine, store, and/or maintain configurations of one or more cache clusters. In addition, the management system may be logically connected to distributed computing resources via a network. The management system may be configured to provision the computing resources as memory caching nodes. The management system may also be configured to associate the provisioned memory caching nodes with any of the one or more cache clusters. In an embodiment, the management system may also be configured to wind down a memory caching node and to remove the computing resources from the cache cluster to a general pool of distributed computing resources. When a cache cluster is updated, the configuration of the cache cluster may be updated in the management system and sent to one or more of the memory caching nodes. As such, each memory caching node may comprise a current version of the configuration of the cache cluster.

As one example, a cache cluster may have four memory caching nodes servicing a web application making requests to a database. Because of heavy traffic, a fifth memory caching node may be brought on line to aid in the servicing of requests between the web application and the database. The memory caching node may be brought online by, as one example, a management system which may provision computing resources for the fifth node and cause the fifth node to spin up as a portion of the cache cluster. After bringing the fifth memory caching node online, the management system may update the configuration for the cache cluster to incorporate the fifth memory caching node. The updated configuration may be pushed to one or more of the memory caching nodes for storage and retrieval. In one embodiment, the clients may receive the updated configuration from a memory caching node without contacting the configuration endpoint. In another embodiment, a static configuration endpoint may receive an update to an alias referencing a memory caching node that comprises the updated configuration. Clients of the cache cluster may receive the alias from the configuration endpoint and receive the updated configuration to minimize caching disturbances.

Configurations may be delivered to clients in a plurality of ways. In one embodiment, a pre-defined configuration endpoint can be queried by a client driver to resolve an address for a memory caching node from which to request a current configuration. The configuration endpoint may be statically declared such that support software, including a client driver for the client system may be able to resolve an alias provided by the configuration endpoint to a memory caching node from which a configuration may be obtained. The configuration can describe how to access memory caching resources of the cache cluster, including the memory caching nodes. This static declaration of an alias allows for new clients to start, resolve a memory caching node, retrieve a configuration and self-configure to current cache cluster conditions rather than manually configure a new client before starting the new client. In another embodiment, the memory caching nodes can also contain reserved space for storing a configuration which describes the structure of the cache cluster. While normal caching of data can cause data to expire, a section of storage within control of the memory caching node may be partitioned such that configuration may be stored in such reserved configuration space without worry of deletion.

A client already in communication with a memory caching node to may also request a current configuration, if newer than the current configuration from a memory caching node. In one embodiment, the request is made if the configuration stored in the memory caching node has been updated from the current configuration that the client has. In another embodiment, the client may request configurations on a periodic basis or random time basis from one or more memory caching nodes. In another embodiment, instead of responding to a request from a client, new configurations may be pushed to the client by the memory caching node upon the event of a configuration change or any other change to the cache cluster. Further still, the configuration of the cache cluster may be sent out to the client by the memory caching node based on time intervals, such as a periodic, heartbeat, expiration, or random time basis. In an additional embodiment, configurations may be pushed to a client when a client makes a request to access the cache cluster. By providing the current configuration, memory caching nodes may be altered with the expectation that clients will update upon access of a memory caching node.

The term provisioning is meant to be read broadly to include the assignment of a computing resource to a use. In some embodiments, this includes preparing the computing resource for use. In one embodiment, a provisioning of a memory caching node would include the assignment of a server, installation of an operating system, installation and configuration of the memory caching node and enabling the memory caching node for use. For example, a provisioning system may select a server to use as a memory caching node. The provisioning system may then create a workflow that prepares the server for use as a memory caching node. As part of the workflow, a machine image may be loaded on the server. The machine image may include operation system, memory caching software and/or settings. After loading the machine image, the server may be caused to boot into the operating system and receive any further software and/or settings. Such settings may include cache cluster configuration. After provisioning is complete, the server may be turned over to a management system for use as a memory caching node.

Turning now to FIG. 1, an illustrative example of a distributed memory caching system 100 in accordance with at least one embodiment is shown. A management system 114 may include one or more computing resources that manage a cache cluster 113 that provides cached information to clients from cache 112. The management system 114 may monitor and adjust the cache cluster 113 based at least in part on service needs and/or failures. A caching service 100 may include a configuration endpoint 106 that comprises an alias for one or more memory caching nodes 110 that form a cache cluster 113 and each memory caching node 110 may serve cached data from a cache 112 and configuration 108. A cache cluster 113 may comprise a plurality of caching nodes 110. In one embodiment, a cache cluster 113 may include multiple memory caching nodes 110. The memory caching nodes 110 may each comprise a virtual machine executing on a computing device such as a server. In another embodiment, a cache cluster 113 may include multiple memory caching nodes 110 executing directly on hardware. As such, it should be recognized that the programs and processes referenced herein may be run on actual hardware or virtual machines.

In one embodiment, the management system 114 may include a monitoring system that monitors the cache cluster 113 and a provisioning system that adjusts the cache cluster 113. The monitoring may include recording measurements and/or determining indicators relating to the input, output and status of components of the cache cluster 113 and/or the caching service 100 as a whole. The provisioning system may provide such services as provisioning new memory caching nodes, de-provisioning current memory caching nodes and determining new configuration 108 based on the changes performed on the caching cluster 113. For example, a monitoring system may detect that a memory caching node 110 is failing and communicate the problem to the provisioning system. The provisioning system may cause a workflow to be created that provisions a new memory caching node 110, removes the failing memory caching node 110 and updates configuration 108. The provisioning system may then cause the workflow to be executed such that a new memory caching node takes the place of the failing memory caching node, the configuration endpoint is updated with a valid alias and one or more of the memory caching nodes 110 receive the new configuration 108. In one embodiment, the provisioning system need only communicate the configuration to one of the memory caching nodes 110, as the memory caching nodes 110 will then propagate the information between them, such as in a peer-to-peer fashion.

The memory caching node 110 may also provide storage for a configuration 108, the configuration 108 may detail communication parameters with the cache cluster 113. In some embodiments, this configuration 108 may be stored in a reserved configuration space that is not subject to cache expiration rules. In one embodiment, the configuration is stored in a cache 112, and a client or management system 114 ensures frequent enough requests and/or updates to ensure the configuration 108 is available. The configuration 108 may be overwritten and/or updated to keep current with changes to the cache cluster 113.

A configuration endpoint 106 may also be provided to aid in configuration 108 retrieval. In some embodiments, a configuration endpoint 106 is a static resource that may be directly referenced as an alias to a memory caching node for configuration 108 retrieval. For example, new clients may be initialized with a hostname of the configuration endpoint 106. Upon instantiation of a new client, the client may connect with the configuration endpoint 106, resolve an alias to a memory caching node and retrieve the configuration 108 from the memory caching node. By providing the configuration endpoint 106, clients may self-configure rather than start with a list of memory caching nodes that may become obsolete and require maintenance. In some embodiments, a client may continue to retrieve a more current configuration 108 by requesting the configuration 108 from a memory caching node referenced in the alias provided by the configuration endpoint 108 or a memory caching node 110. In one embodiment the configuration endpoint is implemented by domain name system (DNS) services. A client may request a static hostname from the domain name server and receive an IP address that resolves to a memory caching node.

Figure 2:
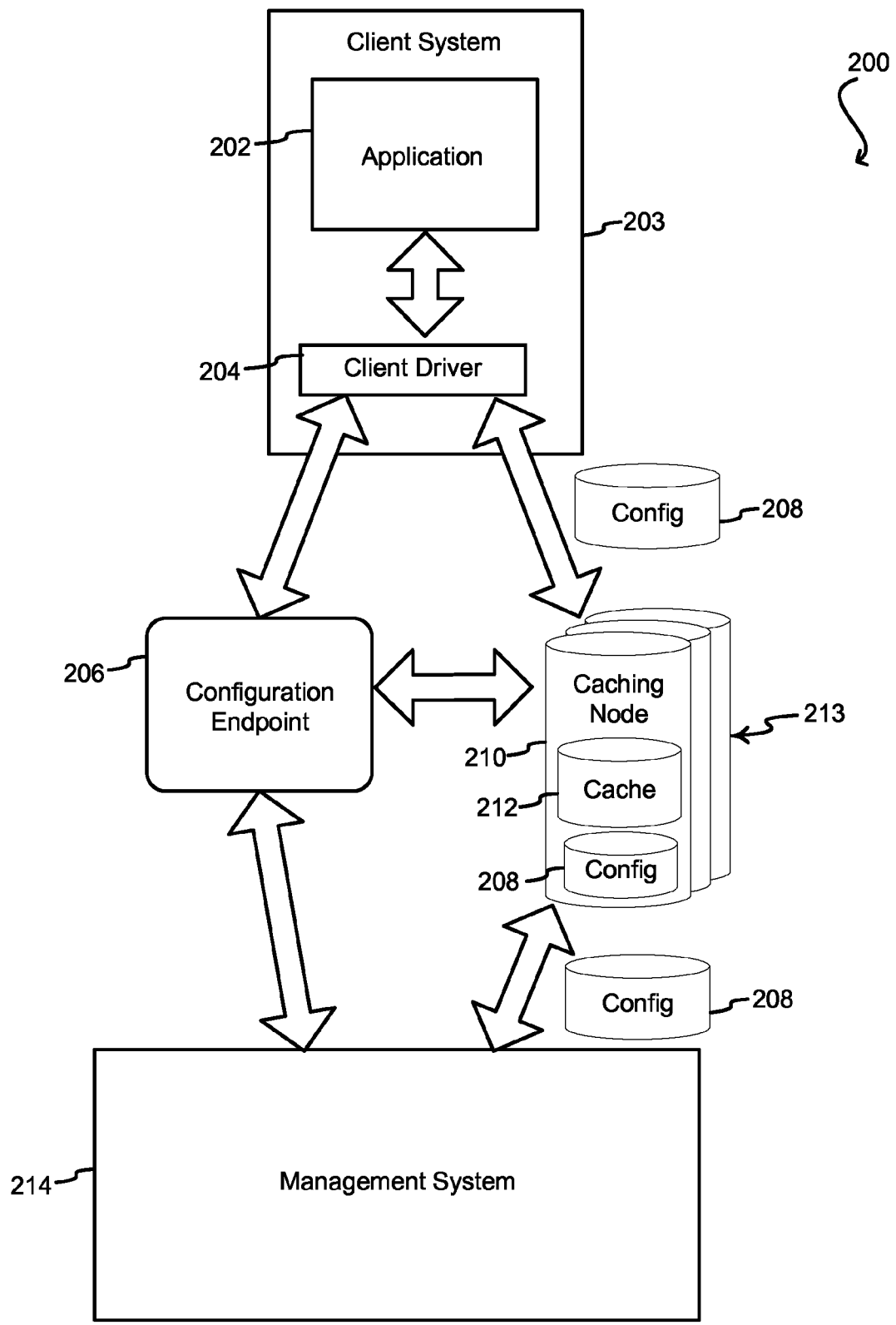
FIG. 2 shows an illustrative example of a cluster caching management in accordance with at least one embodiment.

Turning now to FIG. 2, an illustrative example of a distributed memory caching system 200 in accordance with at least one embodiment is shown. A client system 203 uses a client driver 204 to retrieve information from a cache cluster 213 managed by a management system 214. In the embodiment shown, a client system 203 includes an application 202 that retrieves data from the cache cluster 213. The client system 203 uses a client driver 204 to manage the interface between the application 202 and the cache cluster 213. For example, the application 202 may be a shopping website and the client driver 204 may be a library that exposes the caching functionality through function calls and/or an application programming interface (API).

The client driver 204 may manage the communication with the cache cluster 213. In one embodiment, the client driver 204 supports automatic configuration. An initial configuration of the client driver 204 may be small, such as a hostname of a configuration endpoint 206 that provides an alias at which configuration 208 may be obtained. In one embodiment, the alias is provided as part of the configuration endpoint acting as a domain name server. The configuration 208 may include information needed for the client driver 204 to connect to and use the cache cluster 213. For example, an application 202 may provide a hostname and/or address of a configuration endpoint 206 to the client driver 204 as part of initializing the client driver 204. Using the given hostname and/or address, the client driver 204 contacts the configuration endpoint 206 to resolve an alias to a memory caching node 210 and requests a configuration 208 from the memory caching node 210. In one embodiment, this configuration is stored in a reserved memory space of the memory caching node 210 that is not subject to certain cache rules of a protocol implemented by the cache node (such as the memcached protocol and variations thereof), such as eviction. Information in the reserved memory space may be accessed according to an extension to a standard caching protocol, such as memcached. Upon receiving the configuration 208, the client driver 204 may load the configuration 208. Once loaded, the client driver 204 may verify the configuration 208. In one embodiment, the client driver 204 contacts one or more memory caching nodes 210 and verifies the version of the configuration 208 against a configuration version contained in a second memory caching node 210. The client driver 204 may use the most recent configuration 208 discovered. The client driver 204 may then act upon requests for data from the application 202 by requesting the data from one or more memory caching nodes 210 that store the data in their cache 212. Periodically, the client driver 204 may check the loaded configuration version against configuration versions stored by the memory caching nodes 210. The client driver 204 may elect to use the newest configuration discovered, which may be the current version loaded in the client driver 204. By loading the configuration 208, the client driver can react to dynamic changes in the cache cluster 213. For example, the configuration 208 may identify memory caching nodes 210 that are added or removed from the cache cluster 213. By loading the configuration, the client driver 204 may react to any changes in the cache cluster 213 infrastructure without instruction from the application 202.

Loading the configuration may synchronize, with other computing systems, a client driver's information about the cache cluster. In one embodiment, several client drivers 204 exist at the same time to serve multiple instances of a web application, each on its own server. Synchronizing a configuration of the cache cluster 213 allows each client driver 204 to properly populate and request information from memory caching node 210 that form the cache cluster 213. For examples of populating and cache requests of memory caching nodes, see FIGS. 11-12 and the associated description.

The client driver 204 and caching nodes 210 may communicate using a standard protocol, such as a memcached protocol, and extensions to the protocol. For example, caching operations may use the standard protocol, while configuration operations may use extensions to the protocol, such as additions to a command set of the protocol. In some embodiments, the extension operations operable on the reserved configuration storage may include create, retrieve, update and destroy operations. Other extension operations may include a get configuration version operation, other metadata manipulation operations and a propagate configuration request.

A management system 214 may be one or more computing resources responsible for management of other systems. In FIG. 2, the management system 214 is responsible for the distributed memory caching system 200, including the provisioning and monitoring of memory caching nodes 210 in the cache cluster 213. The management system 214 may also receive instructions from customers and/or administrators such that the management of the management system 214 fits the needs of the customer and/or administrator. For example, a management system 214 may be responsible for a set of memory caching nodes 210 that form the cache cluster 213. The management system 214, through a provisioning system as an example, may cause new memory caching nodes 210 to be instantiated or current memory caching nodes 210 to be stopped. The management system 214 may also be responsible for monitoring the cache cluster 213, which may include monitoring the set of memory caching nodes 210 for indicators. The indicators may include usage, failure or other information about the use and/or underlying systems. A configuration endpoint 206 may also be maintained by the management system 214 to ensure that an alias to an active memory caching node 210 that can provide configuration 208 is always available.

In one embodiment, the management system 214 may use a monitoring system and react to perceived problems with the caching service 200. For example, if a failure occurs in a failed memory caching node 210, the failed memory caching node may be de-provisioned and removed from the cache cluster 213. A new memory caching node 210 may be provisioned to replace the failed memory caching node and recover from loss of the failed memory caching node. In other examples, the failed memory caching node may be repaired by replacing, reinitializing and recovering the memory caching node. Using the changes made to the cache cluster 213, the management system 214 may update the configuration 208 and cause the updated configuration 208 to be stored in each memory caching node 210. If needed, the alias provided by the configuration endpoint 206 may also be updated. In another example, the management system 214 provisions a new memory caching node 210 due to an increase in demand for cached data. The management system 214 may update the configuration 208 with the connection information to the new memory caching node 210 and cause the configuration 208 to be stored in memory caching nodes 210.

A configuration may include information necessary to connect to the cache cluster 213. In some embodiments that use a direct connecting configuration, this may include information to directly connect to each memory caching node 210. In other embodiments using a request forwarding configuration, the configuration 208 may identify a memory caching node 210 responsible for the forwarding of requests to a memory caching node 210 that holds the data in cache 212. In one embodiment, a hybrid approach may be taken where direct connection and request forwarding are both available.

Figure 3:
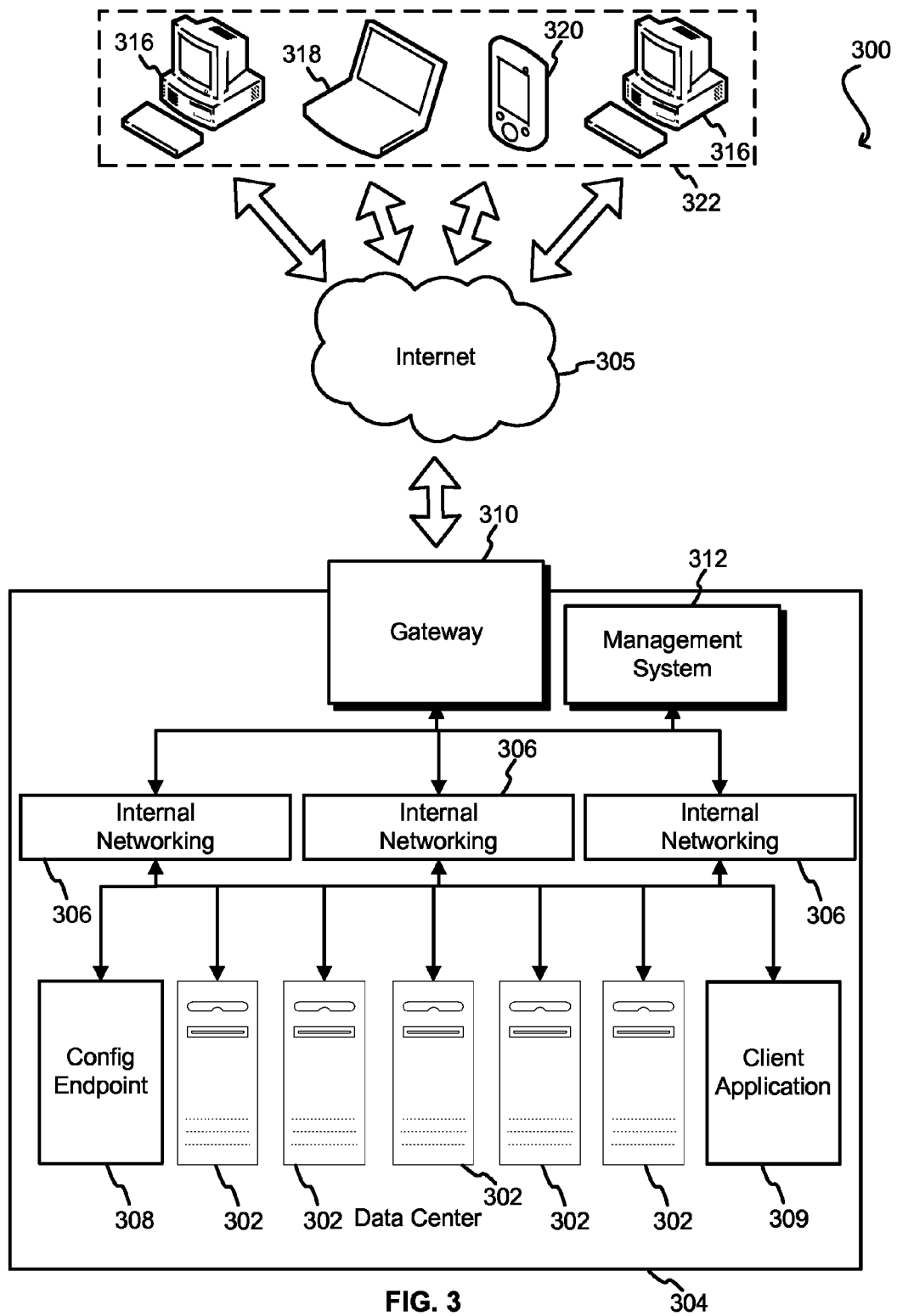
FIG. 3 shows an illustrative example of an environment in accordance with at least one embodiment.

Turning now to FIG. 3, an illustrative example of a distributed memory caching environment 300 in accordance with at least one embodiment is shown. The client application 309 (202 in FIG. 2), management system 312 (214 in FIG. 2) and configuration endpoint 308 (206 in FIG. 2) may exist in the context of a data center. The computers may be divided into trusted computing resources within the data center 304 and untrusted external computing systems 316, 318, 320, sometimes referred to as application clients 322, outside the data center 304. Inside the data center 304, computing resources and networking 306 may be under the domain and control of known administrators and thus have trusted internal connections. Outside of the data center 304 may be beyond the control of administrators, and therefore untrusted, such as the Internet 305.

Inside the data center 304 may be memory caching nodes 302, internal networking 306, a management system 312, a gateway 310, a configuration endpoint 308 and a client application 309. An memory caching node 302 may be connected to other memory caching nodes 302 through internal networking 306. The memory caching nodes 302 may also be connected with a management system 312. The management system 312 may receive requests to manipulate computing resources, including provisioning resources and changing routing. The memory caching nodes 302 and management system 312 may also be connected with a gateway 310. The gateway 310 may filter and route external traffic to a client application 309, such as HTTP traffic to Web servers. For example, a client application 309 may communicate with external systems 316, 318, 320, but memory caching nodes 302 are not allowed external communications.

Outside the data center 304 may be any of a number of different components or environments, and may include the Internet 305 and various external computing systems such as desktops 316, laptops 318 and mobile devices 320, such as electronic book readers, mobile phones, tablet computing devices, etc. The systems 316, 318, 320 may be viewed as untrusted because the systems 316, 318, 320 may not be administered by a trusted administrator. Further, the communication channels, such as the Internet, are not controlled by a trusted administrator. Thus, a message from an external computing system 316, 318, 320 may be intercepted, counterfeited and/or exploited.

In some cases, and for protective reasons, client applications 309 on a secure internal network 306 may only be given the Internet 305 access required to operate, if any at all. For example, a Web server in a data center 304 may only receive outside traffic on port 80 because a gateway 310 provides access controls to the secure internal network that prevent all other Internet 305 traffic from directly reaching the Web server. In another example, a memory caching node 302 on a secure internal network 306 may not be connected to the Internet 305 because it is only queried by a local Web server over the secure internal network. In other embodiments, a client application 309 may be behind a load balancer, which may occasionally direct Internet 305 requests to the client application 309.

Figure 4:
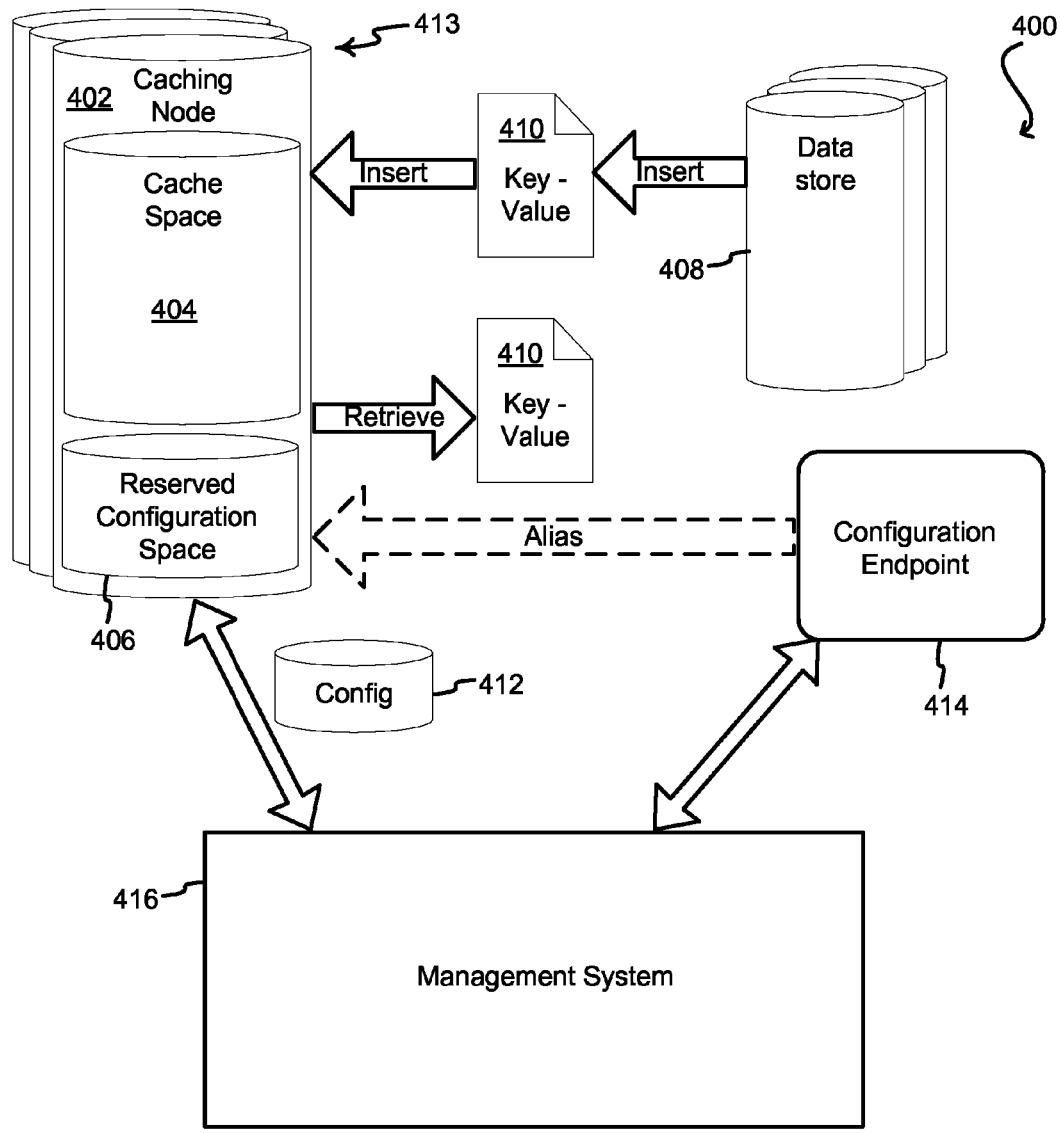
FIG. 4 shows an illustrative example of an embodiment of cluster caching management.

Turning now to FIG. 4, an illustrative example of a distributed memory caching management environment 400 in accordance with at least one embodiment is shown. A management system 416 may monitor and/or manage memory caching node 402. Memory caching node 402 may manage cached key-value pairs 410, respond to requests to provide cached values (from the key-value pairs 410) and provide a configuration 412 identifying how to communicate with the cache cluster 413 and/or each memory caching node 402. Key value pairs 410 may be inserted into a cache of the memory caching node 402 when read and/or changed from a data store 408. The cache cluster 413 allows potentially quicker responses to frequently accessed and/or high access cost data than requesting data directly from the data store 408.

A memory caching node 402 may be provided that includes cache space 404 and reserved memory space 406. The memory caching node 402 may be serviced by virtual and/or physical hardware, including a virtual machine. The memory caching node may receive key/values pairs 410 to store within the cache space 404. The key-values 410 may have an expiration time, as well as early expiration depending on whether the memory caching node 402 runs out of cache space 404. The memory caching node 402 may use an algorithm to determine which key-value pairs 410 may be expired early. In some embodiments, a least-frequently used algorithm is used to determine which items are expired early when a cache is full. In other embodiments, a cost of querying the data store may be factored in. In one embodiment, the expiration may be based on which key-value pairs 410 are not expected to be frequently accessed in the future. The memory caching node 402 may also provide storage for a configuration 412 detailing communication parameters with the cache cluster 413. In some embodiments, this configuration 412 may be stored in a reserved memory space 406 that is not subject to expiration. In one embodiment, the configuration 412 is stored in the cache space 404, but a client or management system 416 ensures frequent enough requests and/or updates to ensure the configuration 412 is available. The configuration 412 may be overwritten and/or updated to keep current with changes to the cache cluster 413.

A configuration endpoint 414 may also be provided to aid in configuration 412 retrieval. In some embodiments, a configuration endpoint 414 is a static resource that may be directly referenced as an alias to a memory caching node for configuration 412 retrieval. For example, new clients may be initialized with a hostname of the configuration endpoint 414. Upon instantiation of a new client, the client may connect with the configuration endpoint 414 resolve an alias to a memory caching node 402 and retrieve the configuration 412 from the memory caching node 402. By providing the configuration endpoint 414, clients may self-configure rather than start with a list of memory caching nodes 402 that may become obsolete and require maintenance. In some embodiments, a client may continue to retrieve a more current configuration 412 by requesting the configuration 412 from a memory caching node 402 referenced in the alias provided by the configuration endpoint 414 or a memory caching node 402 directly.

In one embodiment, the management system 416 assumes responsibility for the configuration 412. In another embodiment, memory caching nodes 402 may be cluster-aware such that, as new memory caching nodes 402 are detected, they may be added to the configuration 412. In another embodiment, the management system 416 may store an updated configuration 412 in an identified memory caching node 402, such as a memory caching node 402 identified by an alias maintained by the configuration endpoint 414. Each memory caching nodes 402 may then monitor the identified memory caching node 402 for changes and download the configuration 412 when it is determined that the configuration 412 has changed. In some embodiments, the identified memory caching node 402 may distribute and/or notify other memory caching node 402 in the cache cluster 413 of changes to configuration 412. By obtaining an updated configuration 412, a client may adapt to dynamically changing memory caching nodes 402 within the caching cluster 413.

A memory caching node 413 may follow a protocol that includes rules governing cached data. In one embodiment, the rules specify cache eviction upon a last recently used basis when the cache space 404 is full. In another embodiment, the rules allow cached data, such as the key-value pair 410 to be associated with a time to live after which the data will no longer be available. In some embodiments, the protocol governing cached data has been extended such that configuration 412 stored in the reserved configuration space 402 is not subject to the rules governing cache eviction and/or time to live.

Figure 5:
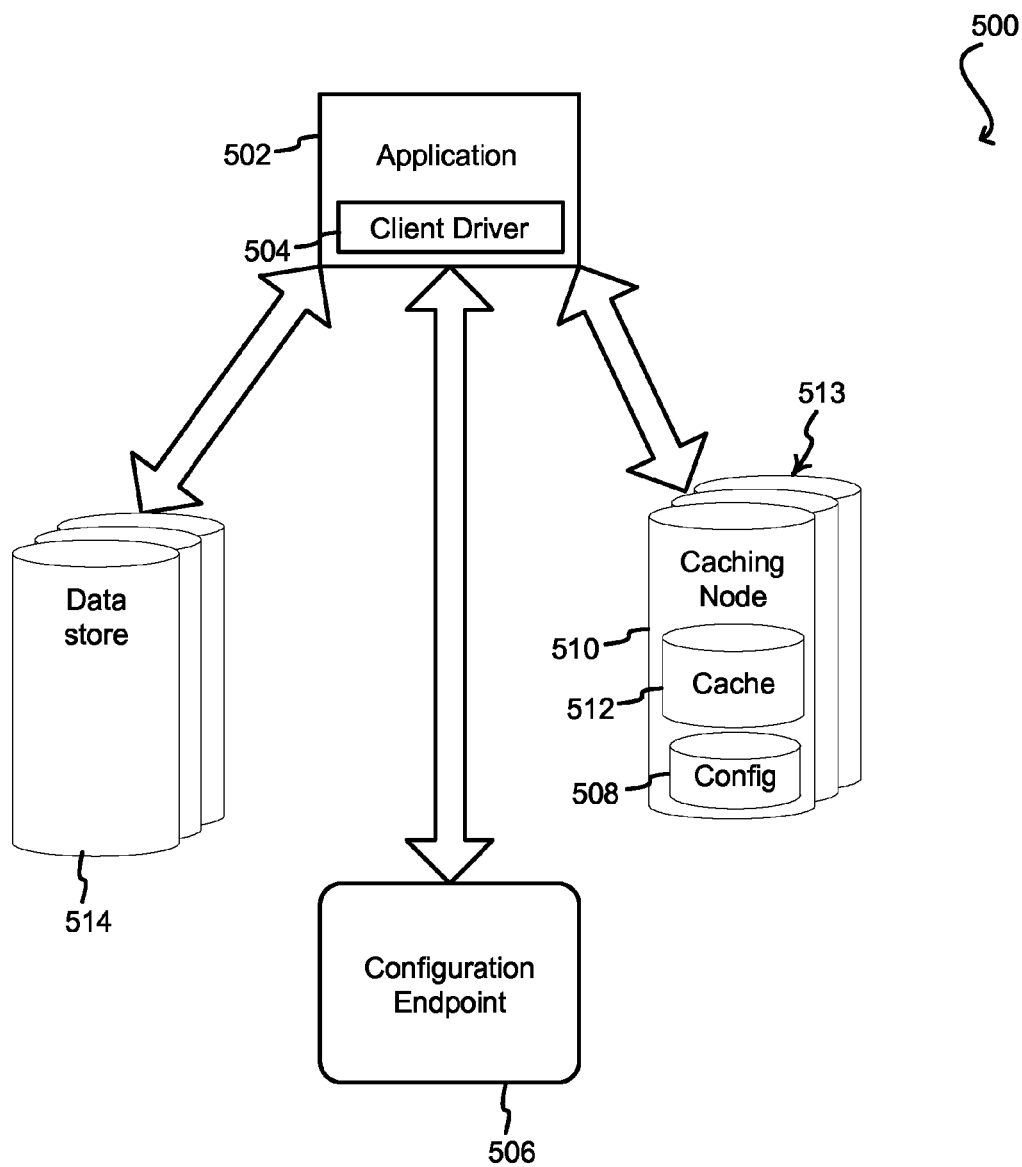
FIG. 5 shows an illustrative example of logical connections between components in accordance with at least one embodiment.

Turning now to FIG. 5, an illustrative example 500 of logical connections between components in accordance with at least one embodiment is shown. A purpose of the cache clusters 513 using memory caching nodes 510 may be to prevent a load on and/or slow response from an API or data store 514, such as a relational database, NoSQL database and key-value store. In the embodiment shown, an application 502 may cause a client driver 504, such as through a library API call, to retrieve a configuration 508 from a memory caching node 510 identified by an alias retrieved from a predetermined configuration endpoint 506. The configuration 508 may include information to enable communication with data store 514 and memory caching nodes 510. Upon configuring the communication, the client driver 504 may field requests from the application 502 for data within the data store 514. The client driver 504 may determine a memory caching node 510 to contact to see if the data is in the cache 512 of the memory caching node 510. If so, the client driver 504 may return the data to the application 502. If not, the client driver may request the information from the data store 514 directly. Because of the request, the data store 514 and/or the client driver 504 may cause the data to be stored in a cache 512 of a memory caching node 510 for future retrieval. In some embodiments, during a request to a memory caching node 510, the client driver 504 may check and/or be notified that a configuration change has occurred.

In some embodiments, request forwarding may occur. For example, a client driver 504 may make a request for data to a first memory caching node 510 that may forward the request to a second memory caching node 510. If the second memory caching node 510 does not have the data requested in cache 512, the second memory caching node 510 may forward the request to the data store 514. The data store may return the requested data, either through the same path or directly to the client driver 504. An advantage of request forwarding is that the client driver 504 need not have a current configuration 508. However, the delays may be more significant than direct communication with a memory caching node 510.

Figure 6:
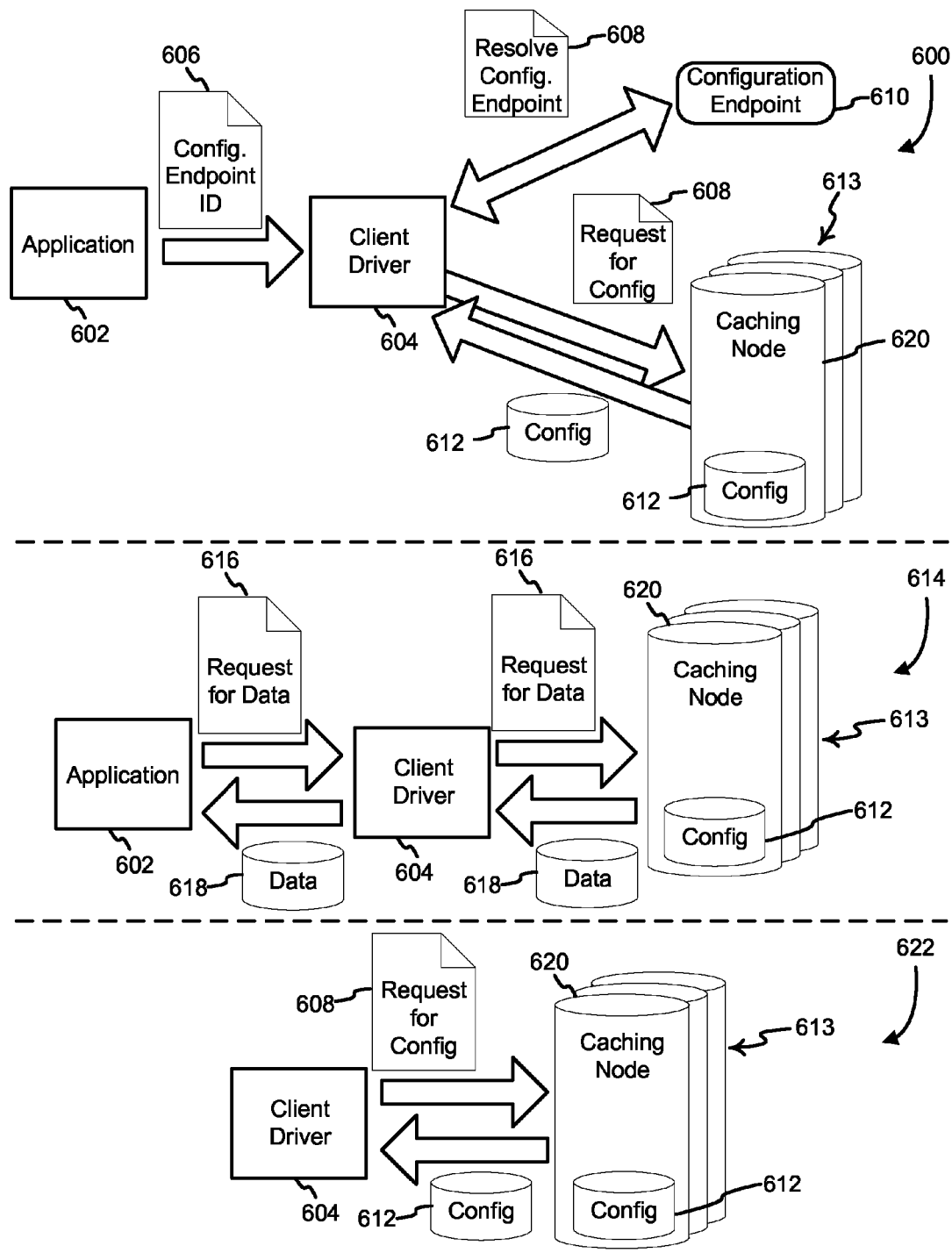
FIG. 6 shows an illustrative chart of a process in accordance with at least one embodiment.

Turning now to FIG. 6, an illustrative chart of distributed memory caching configuration process in accordance with at least one embodiment is shown. This process may be accomplished, in one embodiment, by computing resources such as those seen in FIG. 2 including application 202, client driver 204, configuration endpoint 206 and memory caching nodes 210. The configuration process may include three phases: initialization 600, use 614 and reconfiguration 622. During initialization, a client driver 604 prepares to receive data from a cache on behalf of an application 602 by obtaining a configuration 612. In FIG. 6, the application 602 gives the client driver 604 a configuration endpoint identifier 606 that identifies a configuration endpoint 610, such as by hostname, address or other identifying information. The client driver 604 uses this configuration endpoint identifier 606 to resolve an alias identifying a memory caching node 620 comprising the configuration 612. The client driver requests 608 the configuration 612 from the memory caching node 620. The memory caching node 620 may send the configuration 612 to the client driver 604. The client driver 604 may then load the configuration 612 to enable communications with a cache cluster 613 having memory caching nodes 620.

In some embodiments, a configuration endpoint 610 is ensured for high availability, as new applications 602 rely on the availability of the configuration endpoint alias. The configuration endpoint 610 may be access restricted based on the request or an identifier associated with the request, such as requesting IP address, destination IP address and/or credentials.

In the use phase 614, the client driver 604 may act as an interface between the application 602 and the cache cluster 613. In some embodiments, this interface may be done with an API and/or code library. The application 602 may send a request for data 616 that is analyzed by the client driver 604 to determine which memory caching node 620 may have the requested data in its cache. The client driver 604 may then send the request 616 for data in a format recognized by the memory caching node 620. If the data is found within the memory caching node 620, the memory caching node 620 returns the data 618 to the client driver 604. The client driver 604 may then return the data 618 to the application 602. However, if the data is not found within the memory caching node 620, the client driver's request may fail and/or be redirected to the data store.

In some embodiments, the data in a request 616 may be serviced by more than one memory caching node 620 in a cache cluster 613. In one embodiment, this redundancy may be due to cached data that is expensive to recreate. In other embodiments, this redundancy may be due to reducing a server load due to a collection of frequently accessed data. The client driver 604 may use configuration information 612, information from a management system regarding cache cluster 613, request latency from a memory caching node 620 and/or other information or indicators to determine which memory caching node 620 should be contacted for redundant information. In another embodiment, a memory caching node 620 is randomly selected if the data is available from two or more memory caching nodes 620.

In the reconfiguration phase 622, the client driver 604 ensures that its configuration 612 is up to date by comparing its version with a version known to one or more of the memory caching nodes 620. In one embodiment, a client driver 604 may periodically send a request for configuration 608 to one or more memory caching nodes 620. The contacted memory caching nodes 620 may return a stored configuration 612 which may be compared against a configuration used by the client driver 604. In another embodiment, the client driver may request version information of the configuration 612 from the memory caching node 620. The client driver 604 may compare the version information retrieved against version information of a local configuration. If the retrieved information is a newer version, the client driver 604 may request the new version of the configuration 612. For example, version information may be a combination of a serially incremented number and a timestamp. In some embodiments, the client driver may receive an indicator from a memory caching node 620 that a configuration has changed during the use phase 614, such as a secondary return value.

Figure 7:
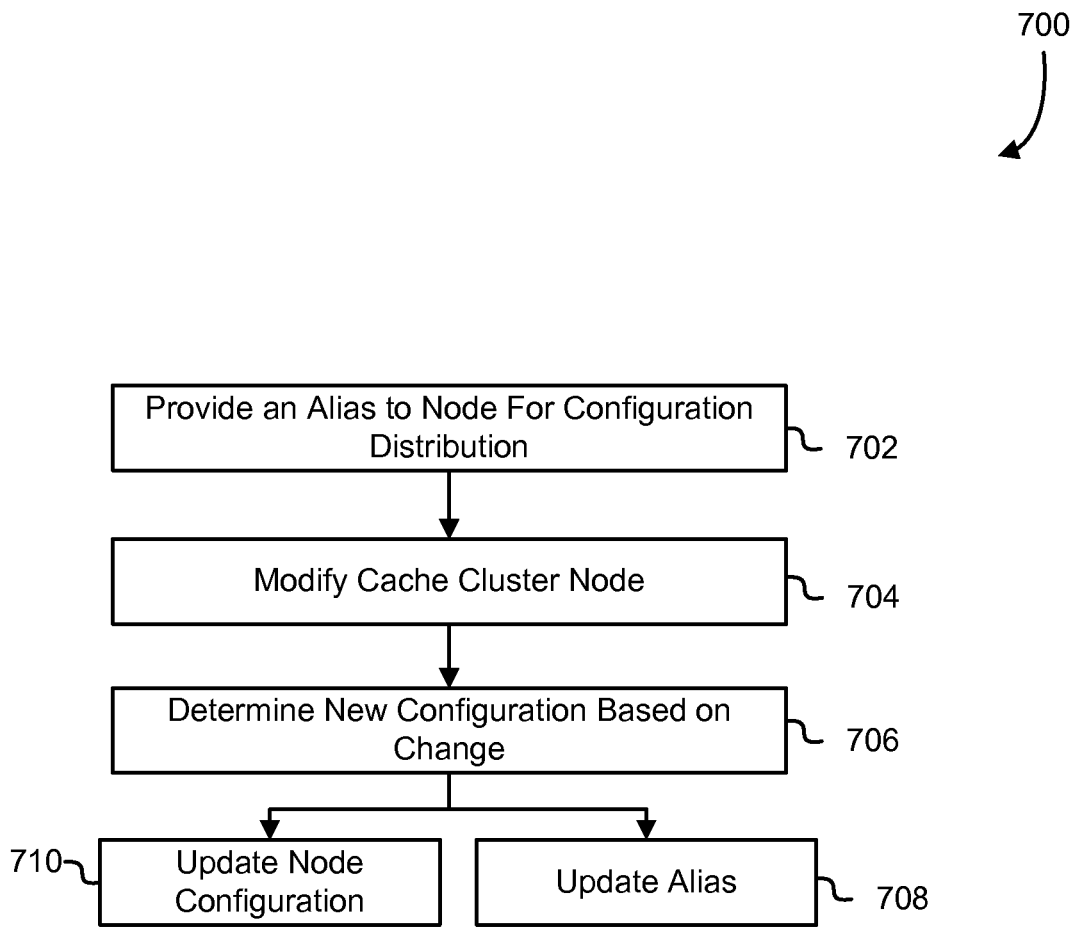
FIG. 7 shows an illustrative example of a process in accordance with at least one embodiment.

FIG. 7 shows an illustrative example of a process 700 that may be used to update configuration in accordance with at least one embodiment. This process may be accomplished, in one embodiment, by computing resources such as those seen in FIG. 2 including application 202, client driver 204, configuration endpoint 206 and memory caching nodes 210. A cache cluster may provide 702 a configuration endpoint to provide an alias to a memory caching node for configuration distribution. Upon modifying 704 one or more distributed memory caching nodes, such as provisioning memory caching nodes, de-provisioning memory caching nodes, movement of keys, changes to key placement or other changes affecting a client configuration, a new configuration may be determined 706 based on the changes performed. Configurations stored in memory caching nodes may be updated 710 as well as the configuration endpoint alias updated 708, if needed. The update to a configuration may be a replacement, concatenation, overwrite or other modification to the configuration data stored in a memory caching node.

Some or all of the process 700 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 8:
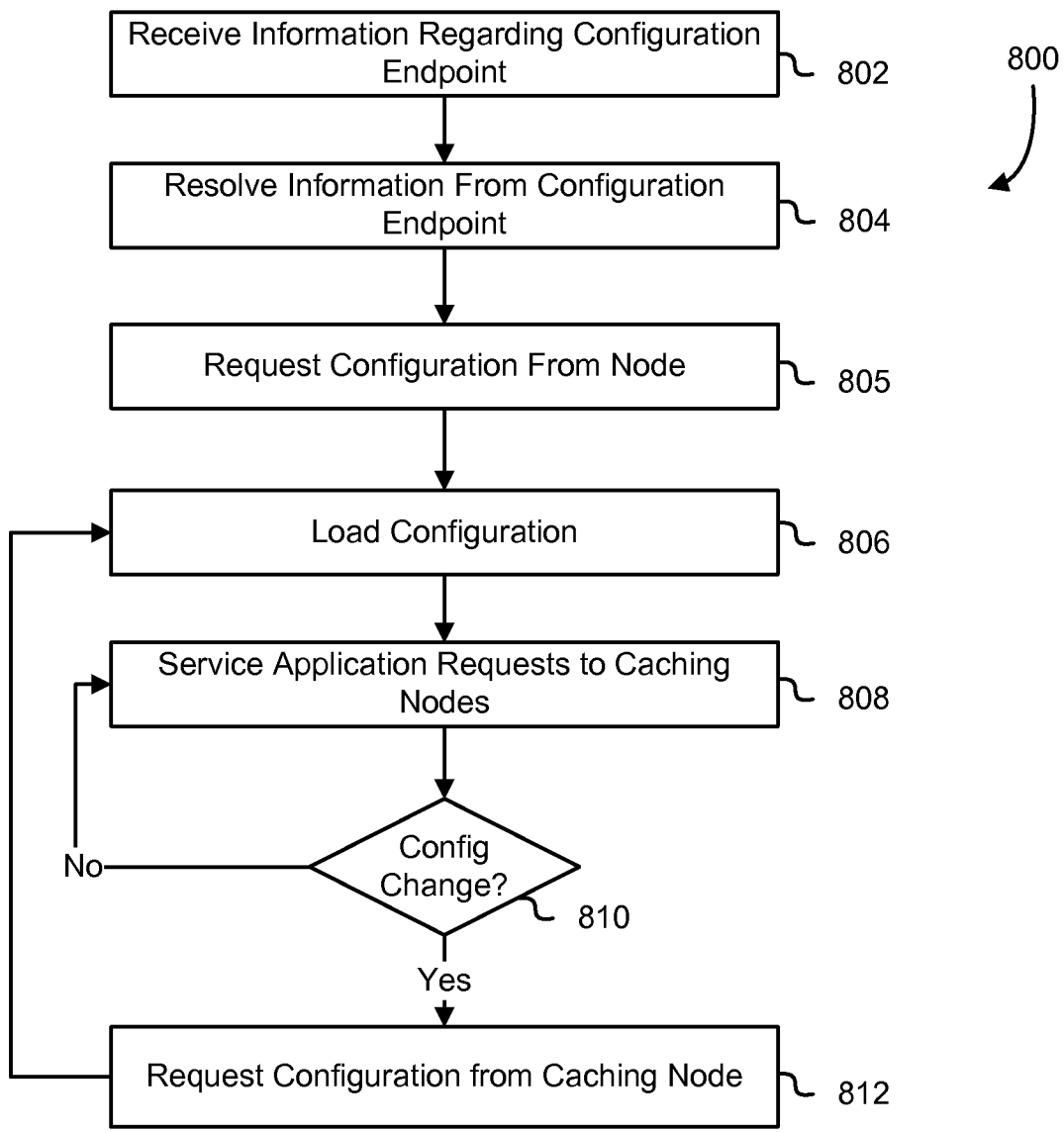
FIG. 8 shows an illustrative example of a process in accordance with at least one embodiment.

FIG. 8 shows an illustrative example of a process 800 that may be used to configure a client in accordance with at least one embodiment. This process may be accomplished, in one embodiment, by computing resources such as those seen in FIG. 2 including application 202, client driver 204, configuration endpoint 206 and cache cluster 213. A client driver may receive 802 initialization information regarding a configuration endpoint. Using the configuration endpoint information, the client driver may request 804 use an alias provided by the configuration endpoint to receive 804 memory caching node information. The client driver may then request 805 a current configuration from the memory caching node. The request may include explicit or implicit identification of the application, client and/or customer requesting the configuration. Explicit identification may include credentials or account information. Implicit identification may include origin, destination, requesting IP address, destination IP address or other inherent characteristics of the requestor or the request. The identification is useful if the configuration endpoint serves multiple aliases for different distributed caching clusters. The client driver may load 806 the configuration and service 808 application requests until a configuration change is needed 810. The need for a configuration update may be checked periodically, noted in a return value from a memory caching node, messaged to the driver or otherwise noticed by or notified to the driver, application or client. If needed, the configuration may be requested from a memory caching node.

Figure 9:
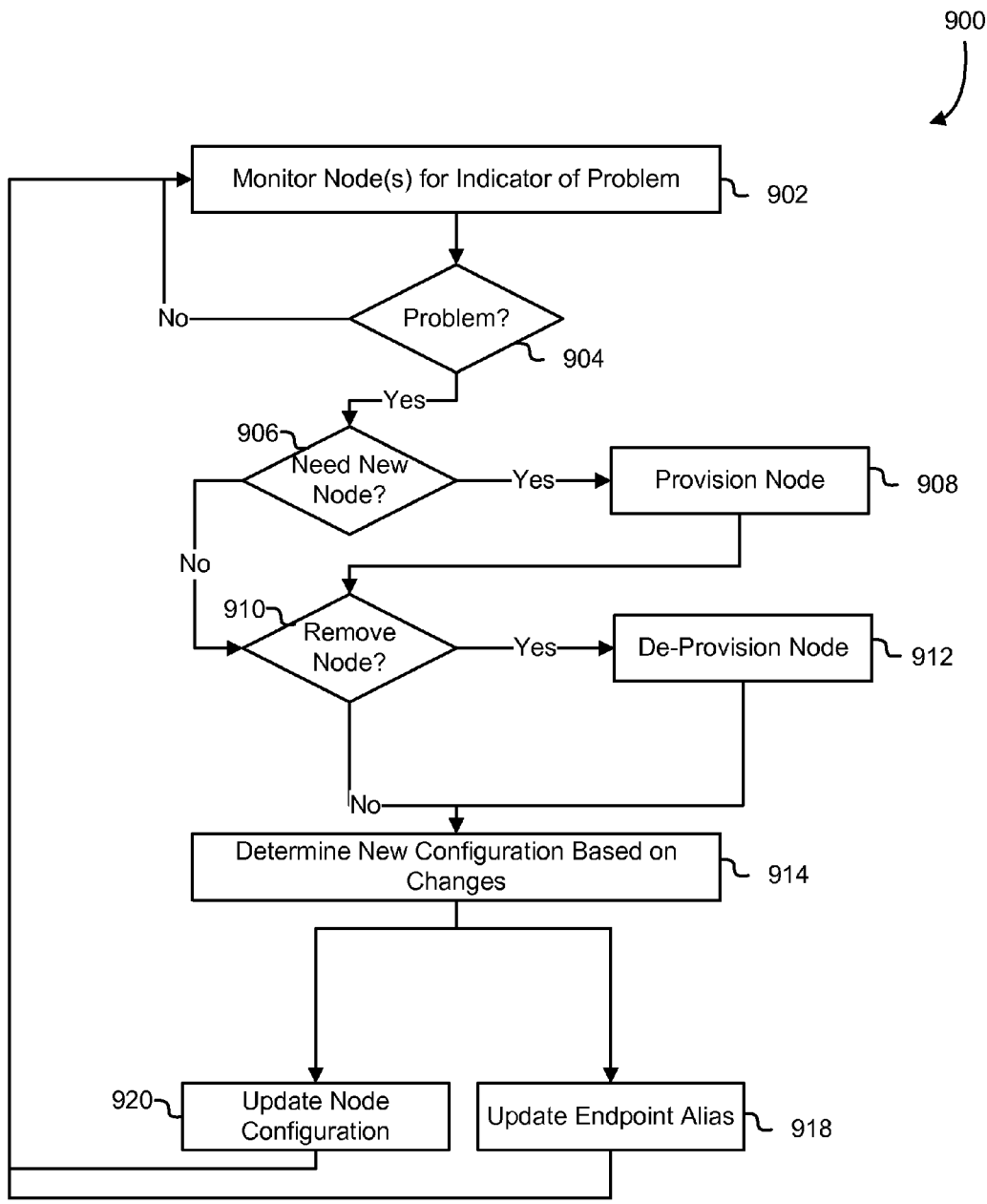
FIG. 9 shows an illustrative example of a process in accordance with at least one embodiment.

FIG. 9 shows an illustrative example of a process 900 that may be used to manage caching in accordance with at least one embodiment. This process may be accomplished by computing resources such as those seen in FIG. 2 including application 202, client driver 204, configuration endpoint 206 and memory caching nodes 210. A management system may monitor memory caching nodes 902 for indicators of a problem. If a problem is discovered 904, new memory caching nodes 906 may be provisioned 908 and/or existing memory caching nodes to be removed 910 may be de-provisioned 912. For example, problems requiring new memory caching nodes to the cache cluster may include a growth in the need for caching bandwidth and/or caching storage. Problems requiring the removal of memory caching nodes from the cache cluster may be the decrease in need of caching bandwidth, failing hardware and/or caching storage. For example, caching may be increased during seasons of high use, such as a shopping website in December. Caching may also be decreased during seasons of low use, such as a ski retailer commerce application in summer. Some problems may also require the provisioning of new memory caching nodes and the removal of other memory caching nodes. This may include failure of a memory caching node and/or the migration from one size of memory caching node to another size of memory caching nodes. After provisioning and/or de-provisioning memory caching nodes, a new configuration may be determined 914 based at least in part on the changes in response to the problem. The new configuration may be pushed to update 920 the memory caching nodes for storage and/or update 918 the alias used by a configuration endpoint.

Figure 10:
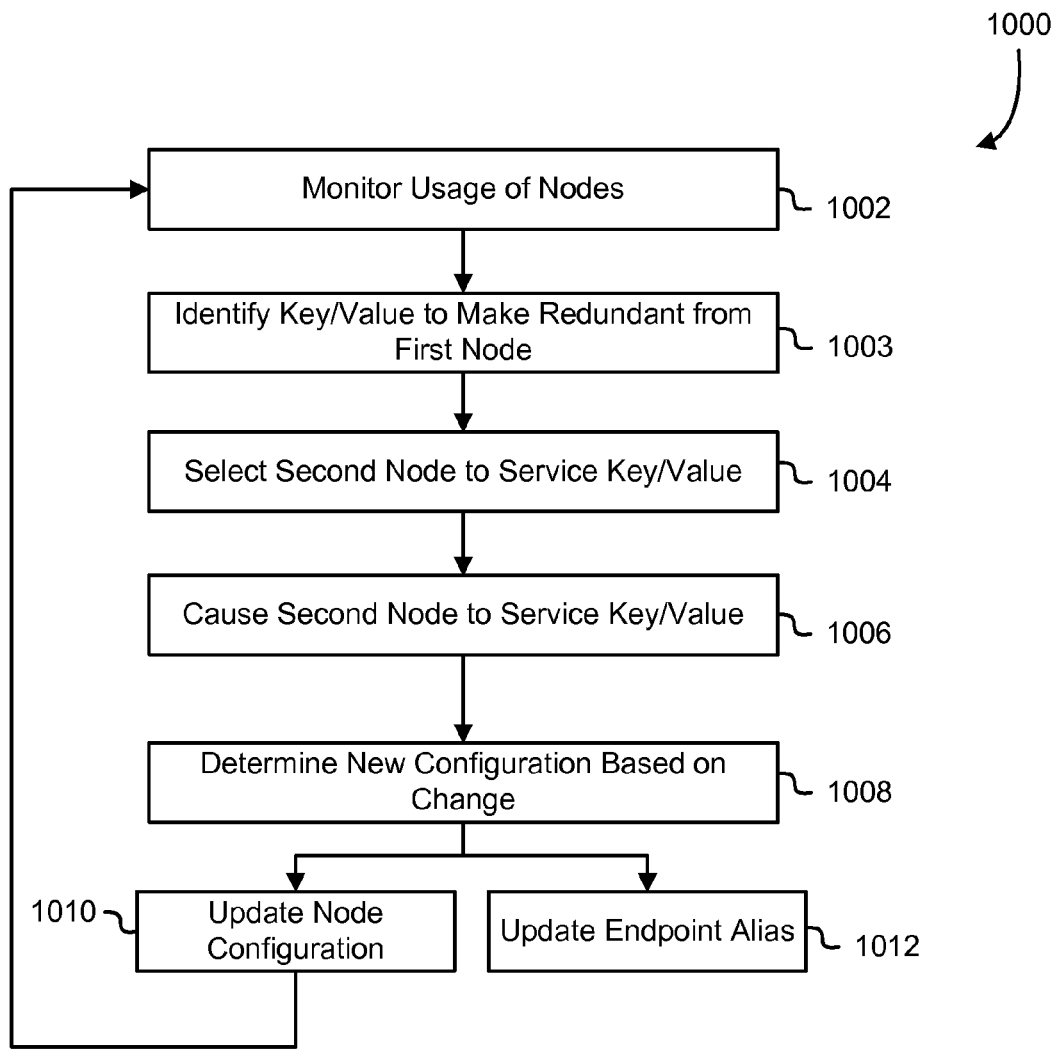
FIG. 10 shows an illustrative example of a process in accordance with at least one embodiment.

Turning now to FIG. 10, an illustrative example of a process 1000 that may be used to manage memory caching node behavior in accordance with at least one embodiment is shown. This process may be accomplished by computing resources such as those seen in FIG. 2 including application 202, client driver 204, configuration endpoint 206 and memory caching nodes 210. During the monitoring 1002 of memory caching nodes, one or more key/value pairs are identified 1003 to make redundant. This redundancy may be used to distribute a high load among memory caching nodes and/or increase durability of a cached key-value pair. A second memory caching node may be selected 1004 and caused to service 1006 the identified key-value pair. The second memory caching node may be identified by load, use patterns, durability or other attributes that make the memory caching node desirable. In some embodiments, important key-value pairs are stored on three or more memory caching nodes. Using the changes, a new configuration may be determined 1008. Using the new configuration, memory caching nodes may be updated 1010 by receiving and storing the configuration. The configuration endpoint may also be updated 1012 by updating its alias.

For example, durability of key-value pairs that are costly to re-calculate may be factored in a decision to make the key-value pair redundant. An algorithm running on a monitoring system within the management system measures frequency of access to determine which key-value pairs will be made redundant. Using the result of the algorithm, the management system may cause a provisioning system to distribute the key-value pairs across two or more memory caching nodes. After distributing the key-value pairs, the management system may then update a configuration and cause the configuration to be stored by memory caching nodes that form part of a cache cluster. In some embodiments, this algorithm may be modified to weigh the costs of key-value pairs, such that costly and frequently accessed key-value pairs may be made redundant. In some embodiments that require further redundancy, multiple configuration endpoints may be used to increase durability.

In some embodiments, the key-value pair may be transferred rather than made redundant. For example, a memory caching node under load may select a range of keys to offload to a second memory caching node. In some cases, the memory caching node under load may have to continue servicing the range of keys until all or most of clients update their configuration.

In some embodiments, configurations may be propagated between memory caching nodes. For example, once a memory caching node receives a configuration, the memory caching node may attempt to distribute the configuration to other memory caching nodes in the configuration. In this way the memory caching nodes may work in using peer-to-peer communication to propagate configuration to each memory caching node. In one embodiment, memory caching nodes in a cache cluster may track nodes within the cache cluster such that changes to the cache cluster are monitored by the memory caching nodes themselves. A memory caching node that notices an addition or subtraction of a memory caching node, or is the subject of the addition or subtraction, may create a new configuration to distribute to the other memory caching nodes.

It should be recognized that the use of the term client driver does not necessarily refer to software that directly supports hardware. The client driver is code executed by a computing resource that at least manages communication between an application and a distributed cache cluster. In some embodiments, this is accomplished by a library. For example, a developer may call functions within a library to perform the phases seen and discussed in relation to FIG. 6.

It should be recognized that the use of the term memory caching node is used as a broad term that covers more than just the specific examples above. Other caching types are included in this term. Other examples of memory caching nodes include persistent caching systems and disk caching systems. In one embodiment, a persistent caching system is used such that a cache state is saved to avoid losing the cache. In another embodiment, a disk caching system may be used.

Figure 11:
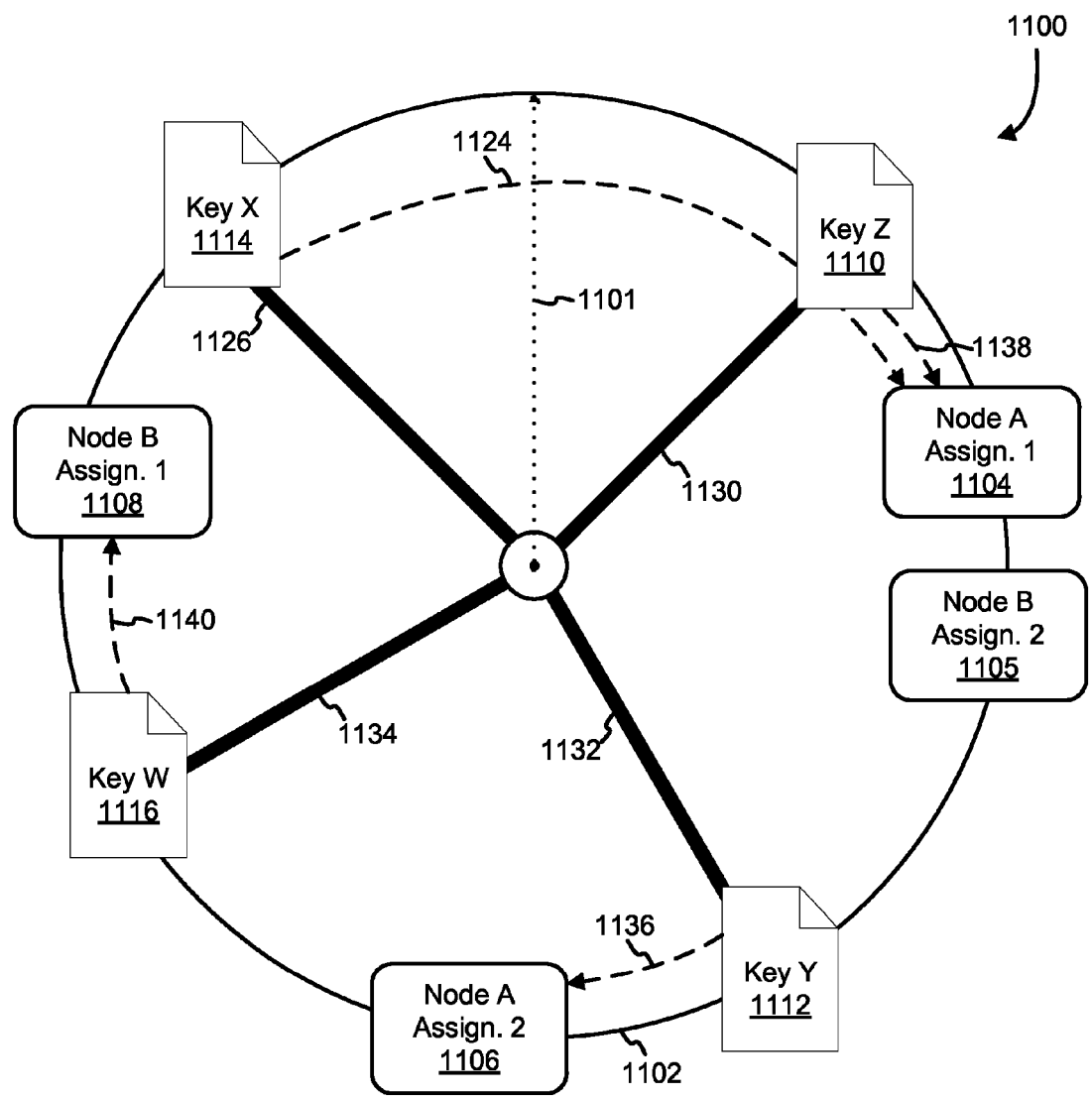
FIG. 11 shows an illustrative example of hashing in accordance with at least one embodiment.

FIG. 11 is an illustrative example of a mapping 1100 that may be used to represent node locations in managed cache retrieval in accordance with at least one embodiment. This process may be accomplished by computing resources such as those seen in FIG. 2, including application 202, client driver 204, configuration endpoint 206 and memory caching nodes 210. A range of possible hashes may be represented by a circle 1102. Although differences in angles may graphically show similar spaces between nodes, any number of hashes may be included within a range of angles. For example, in one embodiment, there may be thousands of hashes contained within a small portion of the circle and in another embodiment, there may not be any hashes contained within a second portion of the circle.

Keys Z (1110), Y (1112), X (1114) and W (1116) correspond to caching angles measured from a reference angle 1101, such as, for example, angles 1126, 1130, 1132 and 1134, shown on circle 1102. The keys may be input into a hashing function that returns a corresponding caching angle. A memory caching node may be assigned at least one caching angle along circle 1102. Larger memory caching nodes may be assigned more caching angles, which may grant a larger coverage over the circle 1102. It is understood that the number of hashes can differ per angle. For example, memory caching node assignments to memory caching node A include caching angle 1104 and caching angle 1106. A key is assigned to a memory caching node first encountered travelling clockwise around the circle from a caching angle corresponding to the key. For example, caching angle 1130 determined from a hash of key Z 1110 is followed clockwise 1138 to the caching angle assignment 1 (1104) of memory caching node A.

In FIG. 11 a caching angle is shown to be measured clockwise from the reference angle 1101. For example, caching angle 1130 may have a smaller angle than caching angle 1126 as measured from the reference angle. To determine which memory caching node is responsible for a key, the key is first processed through a hash function to determine a caching angle. The caching angle may then be followed clockwise until the first memory caching node assignment occurs. For example, key X 1114 resolves to the caching angle 1126 shown. The caching angle is then swept clockwise along line 1124 until the first memory caching node assignment occurs at caching angle 1104 which is assignment number 1 for memory caching node A. Therefore key X is assigned to memory caching node A. Similarly, the caching angle of key Z (1110) sweeps 1138 to caching angle 1104 which is assignment 1 of memory caching node A. For the same reasons, Key Y 1112 is assigned to memory caching node A, assignment 2 (1106) because of the sweep 1136 to the assignment of caching angle 1106. Key W 1116 is assigned to memory caching node B because sweeping 1140 clockwise arrives at the assignment of a caching angle 1108 assigned to assignment 1, memory caching node B.

Memory caching node assignments may be accomplished by several different methods. In one embodiment, the client driver comprises code configured to assign memory caching nodes within the mapping. In such an embodiment, the client may be aware of the angles on the mapping that are "hot" and as such require an additional node to offload one or more requests. In another embodiment, a management system may aid a client driver in assigning caching angles. For example, a management system monitors the access of keys and determines an optimum placement of assignments to reduce server loads on memory caching nodes. The management system may be aware of one or more aspects of the cache cluster in general as well as added nodes that it may provide as "hints" to the client driver.

In another embodiment, one or more clients monitor usage of the memory caching nodes. If needed, a client may request provisioning of a new memory caching node to add to the cache cluster. For example, a client may determine that a latency of a response from a memory caching node has increased beyond an acceptable threshold. As another example, the client may query the memory caching node using a protocol extension or reviewing an access log, the client determines that one or more keys are accessed with a frequency above a threshold. The client may then request that a provisioning system provision a new memory caching node. The client may then assign the memory caching node one or more caching angles.

Figure 12:
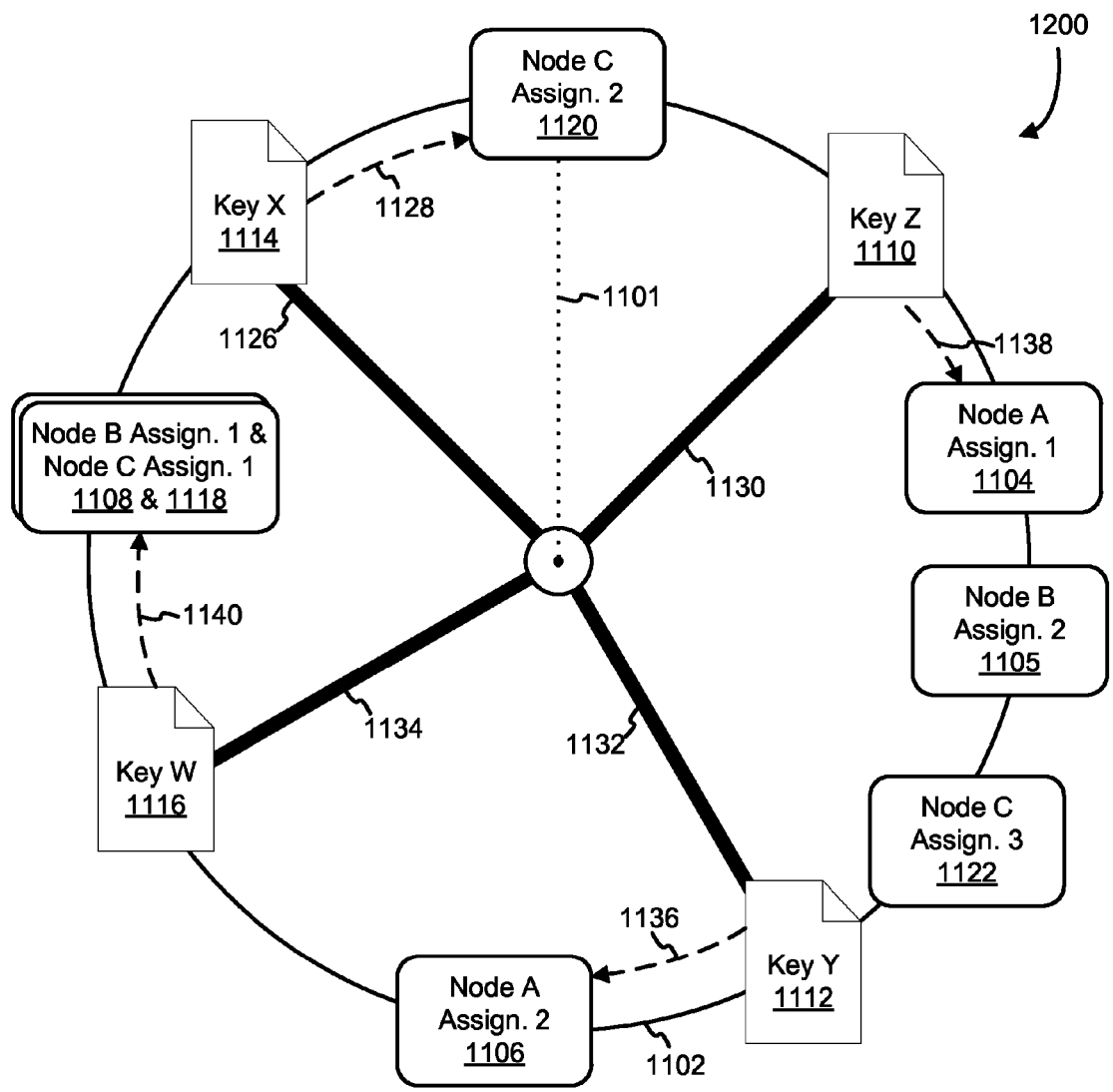
FIG. 12 shows an illustrative example of hashing in accordance with at least one embodiment.

In one example, shown in FIG. 12, a memory caching node C is added to the cache cluster illustrated in FIG. 11. Memory caching node C is able to support three caching angles: caching angle assignment 1 (1118), caching angle assignment 2 (1120) and caching angle assignment 3 (1122). This ability to support three caching angles may be due to the size, processing ability and/or placement of memory caching node C. Further, as illustrated, nodes in the cluster may not necessarily be equidistant from each other in terms of the angular distances between them. Some nodes may be closer to each other than others (in terms of angular distance in the representation in FIGS. 11-12) due to various factors in connection with the key spaces served by the nodes. In the example shown, Key X 1114 and Key Z 1110 may be "hot" keys that are frequently accessed (i.e., accessed with a frequency in a range designated as "hot"), therefore, causing the utilization of caching angle 1104 to be responsible for the high utilization of memory caching node A. A management system may cause a new memory caching node C to receive a caching angle assignment 2 (1120). Due to the new assignment of caching angle 1120, Key X 1114 may now be serviced by memory caching node C, as a sweep of caching angles along line 1128 leads to caching angle 1120 that is assigned to memory caching node C, assignment 2. Key Z 1110 may remain with memory caching node A due to an assignment of caching angle 1104.

In another example, an access history of Key W 1116 may be such that Key W 1116 should be serviced by more than one memory caching node. This replication of the key space may be due to load, difficulty of calculation of the underlying cached value or other replication need. As shown in FIG. 12, memory caching node C, assignment 1 (1118) has been assigned the same caching angle assignment 1118 as the caching angle assignment 1108 of memory caching node B, assignment 1 (1108). Thus, memory caching node B and memory caching node C share responsibility for the same key space. In some embodiments, only a portion of the key space is noted as replicated.

In yet another example, a management system may also determine that the key space covered by caching angle 1105 assigned to memory caching node B, assignment 2 should be smaller. A caching angle 1122 assignment 3 to memory caching node C is added between assigned caching angles 1105 and 1106. As may be noted in FIG. 12, the range responsibility between caching angles 1105 and 1122 need not be symmetric. In some cases, memory caching node C's range may be smaller than memory caching node A's range, but may be more frequently accessed. Considerations, such as range and frequency of access, may be used to determine the assignment of caching angle assignments. It should be recognized that in each of the above embodiments, the client driver may be in control of the determination of the location of the nodes and as such, the management system may provide information which may be used by the client driver in making the determinations.

It should be recognized that while the memory caching angle assignments have been discussed in terms of three or less assignments, actual use may be higher including hundreds, thousands, millions or more of caching assignments. The few assignments shown are for simplifying discussion.

While memory caching nodes have been used for illustration of various aspects of the present disclosure, it should be recognized that the structures and processes described may also be more broadly applied to storage nodes and clusters of computing resources in general. For example, a storage node may include a memory caching node, databases and read-replicas. In one embodiment, membership information of a cluster of nodes is shared with clients of the nodes. For example, the processes and structures may be used in database scaling. Configuration of read-replicas may be stored in a configuration space on a database server. Clients of the database server may detect changes, such as additions or subtractions, to the read-replicas by requesting the configuration from a read-replica, using client configuration update techniques described above. In another example, the processes and structures may be used in database clustering. A cluster configuration may be stored in the database itself alongside the data that makes up the distributed data store of the cluster, which may be retrieved by clients of the database. This allows the client initialization to be decoupled from server resources.

Figure 13:
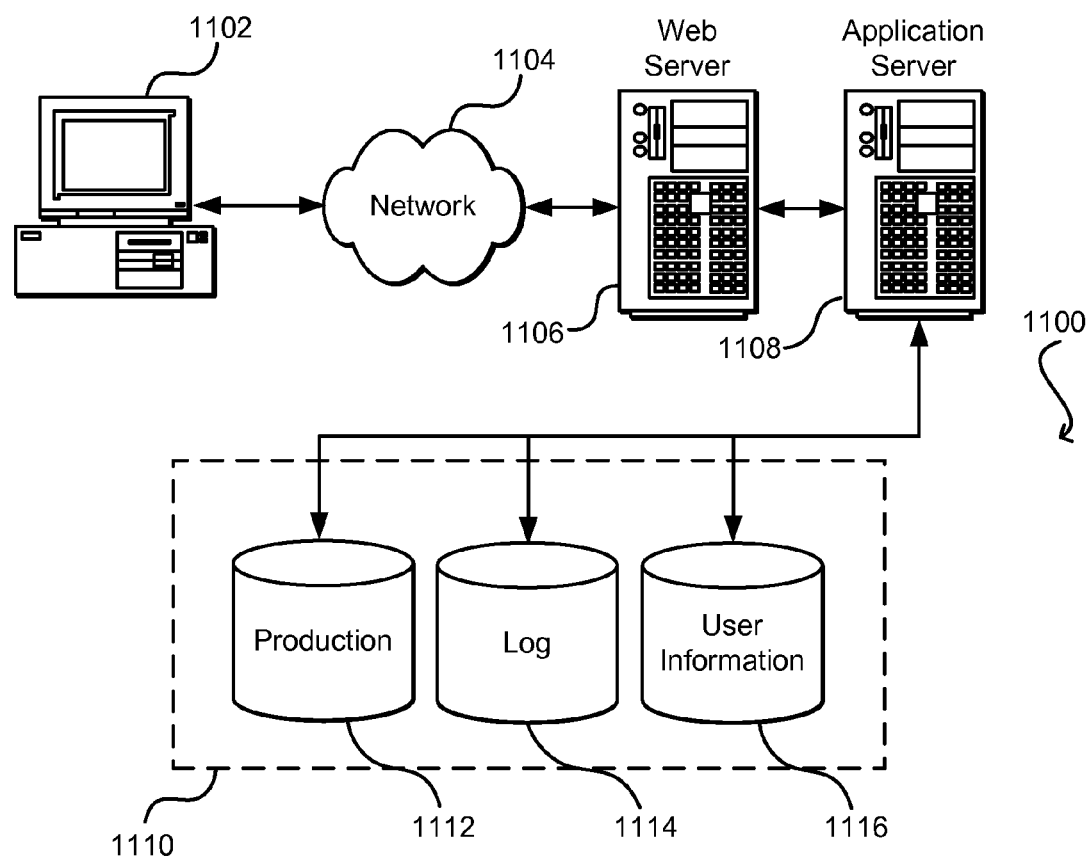
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing a distributed memory caching system, comprising:
    managing, by a management system of the distributed memory caching system, a configuration endpoint of a cache cluster, the configuration endpoint associated with a configuration stored in a partitioned memory space of a set of memory caching nodes, wherein the management system is connected to the configuration endpoint and to the set of memory caching nodes by a network;

monitoring, utilizing the set of memory caching nodes in the cache cluster, for changes to the configuration made by other memory caching nodes in the set of memory caching nodes, each memory caching node of the set of memory caching nodes providing storage for a portion of data contained in the cache cluster and each of the set of memory caching nodes of the cache cluster comprising the configuration;

detecting that a new memory caching node has been added to the cache cluster, the detection that the new memory caching node has been added to the cache cluster being based at least in part on the monitoring by the set of memory caching nodes for configuration changes made by the other memory caching nodes;

provisioning, by the management system, the new memory caching node into the cache cluster;

updating, by the management system, the configuration within the partitioned memory space of at least one of the set of memory caching nodes based at least in part on provisioning the new memory caching node; and updating, by the management system, the configuration endpoint with an alias to a memory caching node of the set of memory caching nodes based at least in part on updating the configuration stored in the partitioned memory space of the at least one of the set of memory caching nodes.

2. The computer-implemented method of claim 1:
wherein the monitoring for changes to the configuration made by the other memory caching nodes in the set of memory caching nodes further comprises detecting a failure of a failed memory caching node from the cache cluster;

wherein provisioning the new memory caching node further comprises causing a replacement memory caching node to be provisioned in place of the failed memory caching node; and wherein updating the configuration within the partitioned memory space of the at least one of the set of memory caching nodes is based at least in part on the replacement of the failed memory caching node with the replacement memory caching node.

3. The computer-implemented method of claim 1:
wherein the monitoring for changes to the configuration made by the other memory caching nodes in the set of memory caching nodes further comprises detecting an indicator indicating a need of additional caching performance from the cache cluster;

wherein provisioning the new memory caching node into the cache cluster further comprises provisioning the new memory caching node in place of a replaced memory caching node that has less resources than the new memory caching node; and wherein updating the configuration within the partitioned memory space of the at least one of the set of memory caching nodes is based at least in part on the replacement of the replaced memory caching node with the new memory caching node.

4. The computer-implemented method of claim 1, wherein updating the configuration endpoint with the alias to the memory caching node of the set of memory caching nodes is based at least in part on provisioning of the new memory caching node.

5. The computer-implemented method of claim 1, wherein provisioning the new memory caching node into the cache cluster further comprises constructing a workflow that includes the operations of:
provisioning the new memory caching node;
adding the new memory caching node to the set of memory caching nodes;
determining a new configuration; and
updating the configuration within the partitioned memory space of each of the set of memory caching nodes.

6. The computer-implemented method of claim 1, wherein the partitioned memory space of at least one of the set of memory caching nodes is excluded from being subject to eviction and the expiration rules defined by a caching protocol.

7. The computer-implemented method of claim 1, wherein the partitioned memory space of at least one of the set of memory caching nodes is configured to be accessed utilizing an extension of a caching protocol.

8. The computer-implemented method of claim 7, wherein the caching protocol comprises a memcached protocol.

9. The computer-implemented method of claim 7, wherein the caching protocol comprises at least one of an eviction or an expiration rule.

10. A computer-implemented method for managing a caching service, comprising:
managing, by a management system, a configuration endpoint of a cluster, the configuration endpoint associated with a configuration of the cluster stored in a partitioned memory space of a set of storage nodes, wherein the management system is connected to the configuration endpoint and to the set of storage nodes by a network;

monitoring, utilizing the set of storage nodes in the cluster, for configuration changes of the cluster made by other storage nodes of the set of storage nodes, the cluster comprising the set of storage nodes, each storage node of the set of storage nodes providing storage for a portion of data contained in a distributed data store;

enabling, by the management system, storage in each of the set of storage nodes, of the configuration for accessing data within the cluster;

detecting that the configuration has been updated, the detection being based at least in part on the monitoring by the set of storage nodes for the configuration changes of the cluster made by the other storage nodes;

as a result of the detection that the configuration be updated, updating the configuration within the partitioned memory space of at least one of the set of storage nodes;

updating, by the management system, the configuration stored in the partitioned memory space of one of the set of storage nodes based on monitoring changes to the cluster; and updating, by the management system, the configuration endpoint with an alias to a storage node of the set of storage nodes based at least in part on updating, by the management system, the configuration stored in the partitioned memory space of one of the set of storage nodes.

11. The computer-implemented method of claim 10 further comprising modifying the cluster by removing a particular storage node from the cluster through the operations of:

de-provisioning the particular storage node; and
reallocating at least a portion of data contained in the particular storage node to at least one of a plurality of remaining storage nodes in the cluster.

12. The computer-implemented method of claim 10 further comprising modifying the cluster by adding a new storage node to the cluster through the operations of:
provisioning the new storage node; and
reallocating a sub-portion of the data contained in the distributed data store to the new storage node.

13. The computer-implemented method of claim 10 further comprising modifying the cluster by altering a characteristic of a particular storage node of the cluster.

14. The computer-implemented method of claim 13, wherein altering the characteristic of the particular storage node further comprises modifying a storage size of the particular storage node.

15. A computer system for managing a caching service, comprising:
one or more computing resources having one or more processors and memory including executable instructions that, when executed by the one or more processors, cause the one or more processors to implement at least:
a set of memory caching nodes forming a cache cluster that:
provide storage for a distributed data cache allocated across the cache cluster;
provide storage of a configuration for accessing data within the cache cluster, the configuration stored in a partitioned memory space of at least one of the set of memory caching nodes;
monitor for configuration changes made by other memory caching nodes in the cluster;
detect changes to the configuration based at least in part on the monitoring; and
update the configuration within the partitioned memory space of the at least one of the set of memory caching nodes based at least in part on detecting the changes to the configuration; and
a management system that:
manages a configuration endpoint of the cache cluster, the configuration endpoint associated with the configuration stored in the partitioned memory space of the at least one of the set of memory caching nodes;
monitors and provisions memory caching nodes;
updates the configuration stored in the partitioned memory space of one of the set of memory caching nodes, the updated configuration being based at least in part on alterations to the cache cluster caused by the management system; and
updates the configuration endpoint with an alias to a memory caching node of the set of memory caching nodes based at least in part on updating the configuration stored in the partitioned memory space of one of the set of memory caching nodes.

16. The computer system of claim 15, further comprising a data store that provides data for the distributed data cache that is allocated across the cache cluster.

17. The computer system of claim 16, wherein the data store is a relational database and wherein the distributed data cache includes responses to queries from the relational database.

18. The computer system of claim 15, the configuration endpoint configured to provide the alias to the memory caching node of the set of memory caching nodes from the cache cluster and the configuration endpoint configured to receive alias updates from the management system.

19. The computer system of claim 18, wherein the configuration endpoint has a static address that is resolvable to a particular memory caching node of the cache cluster.

20. The computer system of claim 15, further comprising a program execution environment in which the cache cluster and management system are allocated computing resources on which to execute.

21. One or more non-transitory computer-readable storage media having collectively stored thereon executable instructions that, when executed by one or more processors of a computer system, cause the computer system to at least:
provide a configuration endpoint of a cache cluster, the configuration endpoint associated with a configuration stored in a partitioned memory space of a set of memory caching nodes;
monitor, utilizing the set of memory caching nodes of the cache cluster, the cache cluster for indications of failure of one or more of the set of memory caching nodes, the set of memory caching nodes providing storage for a portion of data contained in a distributed data cache;
determine that an indicator of a particular memory caching node from the cache cluster has passed a failure threshold, the determination that the indicator has passed the failure threshold being based at least in part on the monitoring by the set of memory caching nodes;
cause the particular memory caching node to be removed from the cache cluster; and
update the configuration stored in the partitioned memory space of each of the set of memory caching nodes of the cache cluster based at least in part on the determination that the indicator of the particular memory caching node has passed the failure threshold, the update of the configuration stored in the partitioned memory space of each of the set of memory caching nodes causing the computer system to update the configuration endpoint with an alias to a memory caching node of the set of memory caching nodes.

22. The non-transitory computer-readable storage media of claim 21, wherein the executable instructions further comprise instructions that, when executed, cause the computer system to at least:
cause a new memory caching node to be provisioned and added to the cache cluster; and
update the configuration within at least one memory caching node from the cache cluster based at least in part on the provisioned new memory caching node.

23. The non-transitory computer-readable storage media of claim 22, wherein updating the configuration stored in the partitioned memory space of each of the set of memory caching nodes of the cache cluster further comprises updating the configuration such that the new memory caching node replaces the particular memory caching node removed from the cache cluster.

24. The non-transitory computer-readable storage media of claim 21, wherein the configuration stored in the partitioned memory space of each of the set of memory caching nodes of the cache cluster comprises connection information to the cache cluster.

25. The non-transitory computer-readable storage media of claim 21, wherein updating the configuration stored in the partitioned memory space of each of the set of memory caching nodes of the cache cluster causes the set of memory caching nodes to propagate the configuration using peer-to-peer updating.

* * * * *